United States Patent
Rhome

(10) Patent No.: US 10,299,499 B2
(45) Date of Patent: May 28, 2019

(54) SELF-CONTAINED POPCORN POPPER

(71) Applicant: Gold Medal Products Company, Cincinnati, OH (US)

(72) Inventor: Timothy A. Rhome, Milford, OH (US)

(73) Assignee: Gold Medal Products Company, Cincinnati, OH (US)

( * ) Notice: Subject to any disclaimer, the term of this patent is extended or adjusted under 35 U.S.C. 154(b) by 511 days.

(21) Appl. No.: 14/504,854

(22) Filed: Oct. 2, 2014

(65) Prior Publication Data

US 2015/0099047 A1 Apr. 9, 2015

Related U.S. Application Data

(60) Provisional application No. 61/888,267, filed on Oct. 8, 2013.

(51) Int. Cl.
*A23L 7/183* (2016.01)

(52) U.S. Cl.
CPC .................................. *A23L 7/183* (2016.08)

(58) Field of Classification Search
CPC ... A23L 1/18; A23L 5/17; A23L 7/161; A23L 7/183
USPC ........................................................ 99/323.5
See application file for complete search history.

(56) References Cited

U.S. PATENT DOCUMENTS

| | | | | |
|---|---|---|---|---|
| 4,103,720 A | * | 8/1978 | Eisenberg | B65B 3/26 141/1 |
| 4,575,299 A | * | 3/1986 | Layton | B65G 49/0459 134/76 |
| 5,441,279 A | * | 8/1995 | Messina | A47B 37/00 273/309 |
| 5,771,779 A | * | 6/1998 | Stein | G07F 17/0078 99/323.7 |
| 7,874,244 B1 | * | 1/2011 | Rhome | F24C 15/20 99/323.5 |
| 8,381,638 B1 | * | 2/2013 | Rhee | A47J 37/0754 99/426 |
| 8,516,953 B2 | * | 8/2013 | Fiori | A47J 39/003 126/21 A |
| 2013/0269541 A1 | * | 10/2013 | Carter | A47F 3/001 99/483 |
| 2013/0280386 A1 | * | 10/2013 | Cretors | A23L 1/1812 426/233 |
| 2014/0096689 A1 | * | 4/2014 | Stolle | A47J 39/003 99/483 |

* cited by examiner

*Primary Examiner* — Dana Ross
*Assistant Examiner* — Joe E Mills, Jr.
(74) *Attorney, Agent, or Firm* — Wood Herron & Evans LLP

(57) ABSTRACT

A self-contained popcorn popper has an open side provided with an air-flow curtain extending at least partially across the open side and directed inwardly. Effluent from popping flows upwardly into a "U"-shaped vent, through an effluent filter and flows into said air flow curtains to reduce particulate-bearing effluent emitted from the popper cabinet. Heated air is recirculated in a lower warming bin to maintain heat in popped corn dumped from a popping kettle and that air is recirculated in the bin, also to reduce emission of particulars into the environment surrounding the popper.

13 Claims, 4 Drawing Sheets

SELF-CONTAINED POPCORN POPPER

RELATED APPLICATION

The Present application claims priority to U.S. Ser. No. 61/888,267 filed Oct. 8, 2013, the disclosure of which is hereby incorporated herein by reference in its entirety.

FIELD OF THE INVENTION

This invention relates to controlling the emissions of particulates from food preparation processes and more particularly to apparatus and methods for controlling the emission of particulates from popcorn popping operations. The term "controlling" as used herein refers both to the reduction and the substantial elimination of such particulates, at least to the extent of detection by current testing procedures and regulations.

BACKGROUND OF THE INVENTION

In the past, popcorn poppers as disclosed in U.S. Pat. No. 7,874,244 used a blower and filter combination to capture, from within the popper cabinets, oil, steam, smoke and particulates from the popping process. Within the cabinet, the system would filter said particulates from the air and then exhaust the filtered air to the outside of the popper cabinet.

The amount of particulates not filtered out but permitted by current standards or regulations to exhaust to the surrounding air outside the popper is limited to 5 mg/cubic meter of air discharged from the filter system. Also, no visible particulates should be permitted to escape the cabinet per the testing standard from the open areas of the popper. However, for measurement and an actual analysis, there are particulates found escaping from these openings that are not accounted for during the testing because they are not visible, or detectable with current techniques.

The emission of particulates from a popcorn popping process, via filtered or unfiltered air discharging into the surrounding environment in which a popper operates, is undesirable and can create a number of ultimately significant disadvantages. For example, many movie theaters have adopted digital projection system or are moving in that direction. Discharged particulates from the poppers in the theater can deposit or gather on the components of the equipment or related media, whether digital or conventional, adversely affecting or damaging projection and other performance parameters. Some particulates can be troublesome due to being microscopic in size. Particulate deposits of this nature are difficult to clean.

In applicant's prior U.S. Pat. No. 7,874,244, a self-contained popper relieved the particulate discharge disadvantage to some extent by creating defined airflow within the popper cabinet and filtering out particulates before that airflow was discharged into the surrounding environment.

Particulate components of such discharges were reduced to such an extent that large capacity poppers with open-sided cabinets could be used to pop popcorn and maintain it at a warm temperature, all without the necessity of connection of the popper to an existing exhaust duct system, or of modifying a building or theater by adding necessary but costly exhaust ductworks. U.S. Pat. No. 7,874,244 is thus expressly incorporated herein by reference as if fully expressed in writing herein as exemplary of these considerations. However, further reduction and elimination of particulate emissions is desired.

Thus, while such prior system provided unique and significant advantages to the industry, as disclosed in that patent, it is now desired to provide an improved, open, popcorn popper where there are no significantly measurable emissions of any air carrying any visible, measurable or significant particulate components.

It is also desirable to take advantage of the natural tendency of the steam carrying the particulates to rise. In prior systems, the blower produced significant flow to draw the steam-borne particulates into the filter system. The filters for that unit were sized based on the cubic foot per minute flow produced by the blower.

It is now desired to significantly eliminate the emission of air from an open popcorn popper, and thus to significantly reduce to an immeasurable or very low level any particulates from a popcorn popper and warmer even where the cabinet housing the cooking kettle and popcorn warming area has one or more fully open sides.

SUMMARY OF THE INVENTION

To accomplish that goal, this invention contemplates a static popping system which wholly recirculates air, reducing air escaping outside the cabinet, filtered or not. More particularly, one embodiment of the invention uses two blowers producing separate and distinct airflow paths contained within the popper cabinet. The first is a blower integral with the filtering system for popping effluent. The second is a blower used in maintaining the warm popcorn temperature after popping and prior to serving. By recirculating the air from both airflow systems within the popper and reducing airflow escaping from open cabinet sides, no significant particulate components or emissions are emitted from the popper cabinet.

This is accomplished in part through the use of air or effluent-flow curtains sealing off leakages through the cabinet openings of particulate bearing emissions, as well as by recirculation of air within recirculated passages.

In the current improved embodiment, an intake ductwork is provided in a rectangular "U" shape around the top underside of the cabinet and above the kettle level, thus allowing the particulate-laden steam to rise naturally into the internal vent ductwork. This allows for smaller filters to be used to capture the particulates from that flow. This will also reduce the force and speed with which the particulates pass through the filter media, allowing for a higher percent of particulate capture. Significantly, such filtered air, according to the invention, is not discharged from the popper cabinet but rather is contained and recirculated. Despite the efficiency of the filter media, there will still be micro particles that will pass through the media on at least the recirculating first pass, thus another reason for recirculating the filtered air. Each time the micro particles pass through the recirculation system, they will collide with other particles until most of them coalesce to a size that can be captured and filtered out of the airstream.

With the recirculation of the filtered air, consideration is also given to the potential flow of the air through any open sides of the cabinet. In the interior of the cabinet is the popcorn kettle, either suspended or pedestal mounted. The in-cabinet air flow is directed in such a way as to miss the kettle so as not to create turbulence in the air flow. As the air is ducted back through the intake vents inside of the top wall of the cabinet, it is filtered and then divided into two paths by a distribution duct. The distribution duct divides the air equally into two curtain projectors located at the front and back of the popper near the corners. The curtain projectors each have a perforated cover which produces an air curtain blowing across the front opening of the cabinet (operator side), and in the case of an open pass through popper cabinet design, across the rear or back opening of the cabinet. These curtains of air or of mixed air and effluent prevent particulates from escaping through the front or rear openings. The air flow curtains prevent any turbulent air passing onto or adjacent the kettle from escaping the cabinet. Air bearing particulates are captured in the recirculation filters, without significant effluent discharge therefrom.

A second source of air flow or second flow path in the cabinet comes from the popcorn warmer located in the bottom of the popper cabinet where the popped popcorn is held until served. The purpose of this system is to keep the popcorn at serving temperature and to keep it from absorbing moisture. In the earlier popper noted above, a long 800 watt tubular element and a 105 CFM blower were used. The location of this warmer was at one end of the popcorn holding bin.

In the embodiment of the invention herein, a more compact 750 watt tubular element and a compact 107 CFM blower are used. The location of this warmer is central to the holding area, allowing a more uniform distribution of the heated air through the popped popcorn.

The intake duct on the earlier popper pulled outside air into the warmer cabinet. In the new embodiment of the invention herein, the intake is located above or at the top of the popped popcorn holding bin, thus pulling and recirculating the air from the warmer within the cabinet. This will also resolve the propensity of the old warmer design that pulled chaff from the corn into the system.

A further benefit of the invention herein is in regard to fire containment in the event a fire would ever occur. With the older popper, a fire damper was placed on the blower exhaust that depended on a link to break at a given temperature to close the exhaust and prevent the fire from escaping through the exhaust. However, it was possible for flames to escape prior to the linkage reaching the necessary break temperature. With the design herein, recirculating the air back through the cabinet, there is no path to the exterior of the cabinet for the fire to escape. In addition, the air curtain across the front and rear openings of the cabinet will keep any fire from escaping through those openings until the extinguishing system douses the fire.

This invention thus contemplates an exhaust-less, self-contained or duct-less popcorn popper comprising a cabinet housing a popping kettle and a popcorn warming bin, the cabinet having at least an open side, or opening in a cabinet side, wherein recirculating air flows are created within and about the cabinet for recurring filtration and wherein air is not generally emitted or discharged from the cabinet, nor any opening thereto, thus reducing discharge of particulates from the popping process. Such a popper can be installed and used without any external venting or ductwork, and costs thereof, while meeting or exceeding current standards for any particulate discharge and substantially less than 5 mg per cubic meter over an entire popping operation cycle of eight hours or more.

These and other advantages will be readily apparent from the following further details and from the drawings in which:

DETAILED DESCRIPTION OF THE INVENTION

Figure 2:
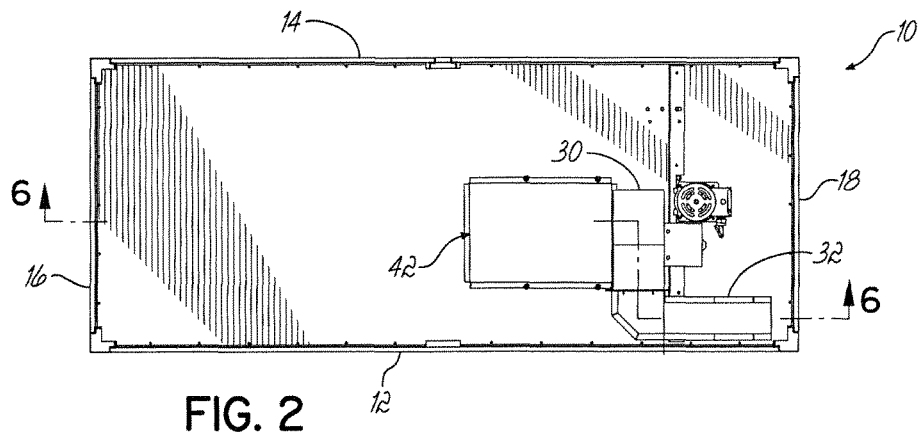
FIG. 2 is a top plan view of the invention of FIG. 1.
Figure 1:
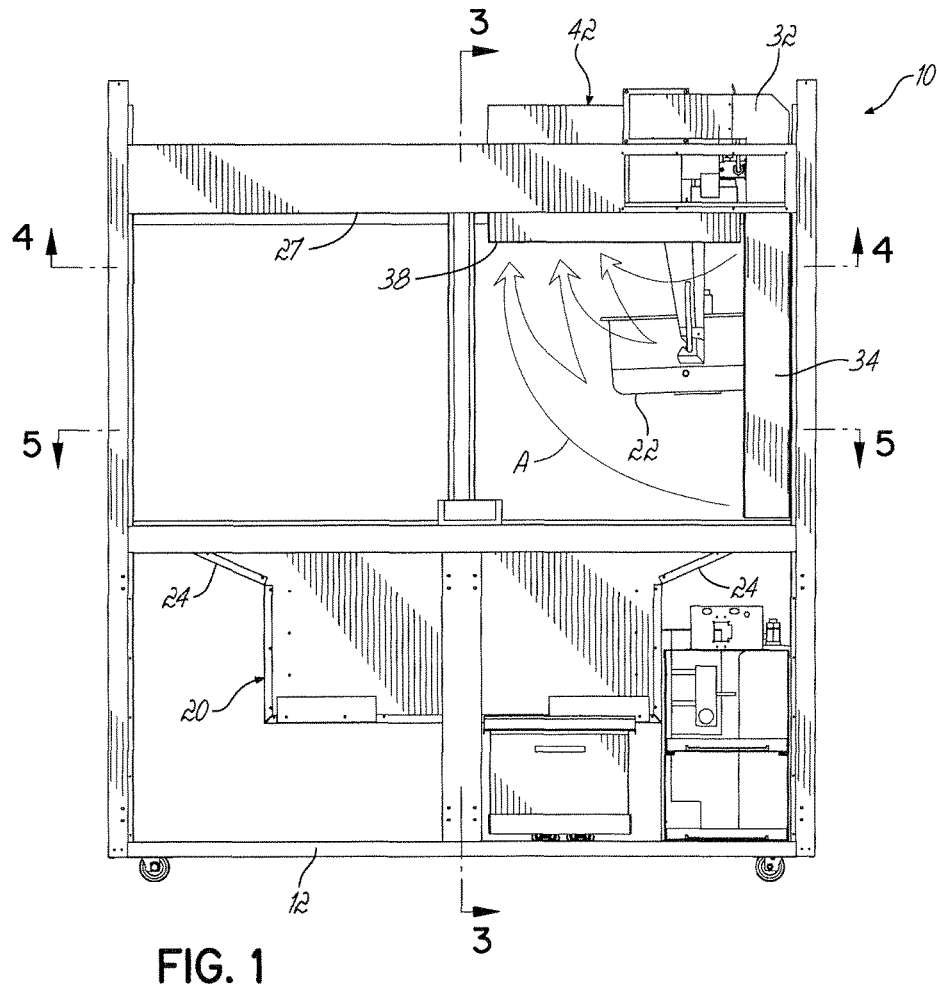
FIG. 1 is a front elevational view of the invention.
Figure 3:
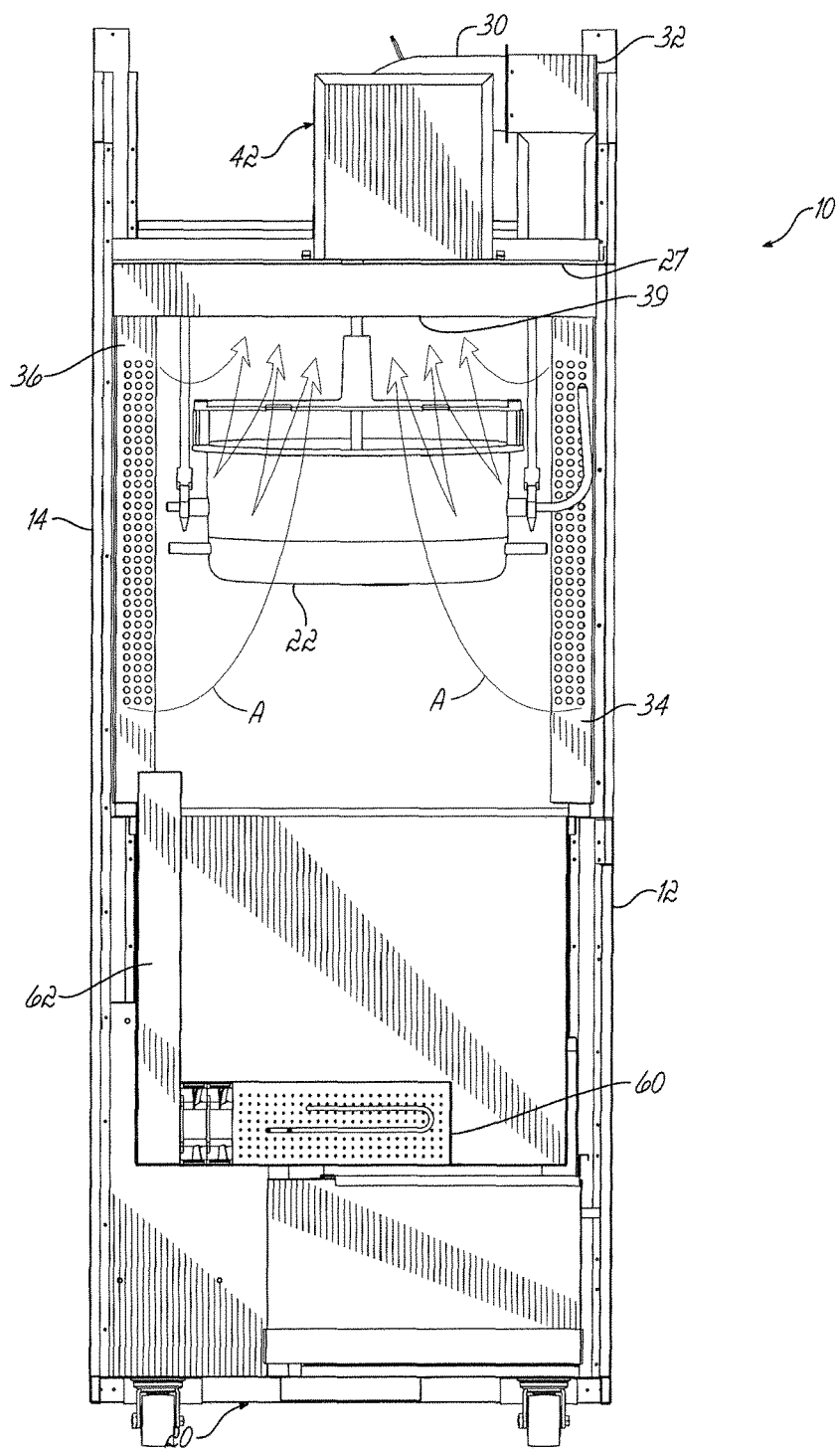
FIG. 3 is a cross-sectional view taken along lines 3-3 of FIG. 1.

Turning now to the drawings, there is illustrated in FIG. 1 a popper cabinet 10 according to the invention having a front or operator side 12 and an opposed parallel optionally open rear side 14, and two opposed closed ends 16 and 18. A popped popcorn receiving open-top bin or chamber 20 is disposed in a lower portion of cabinet 10.

A tiltable popcorn popping kettle 22 of any suitable construction as is well-known, is operably disposed within an upper portion of cabinet 10 for popping popcorn and tilting to deposit popped popcorn into open-topped bin 20.

It will be appreciated that the sides 12, 14 of the cabinet are open from end 16 to end 18 in the upper portion of the cabinet 10 above bin 10 so the kettle 22 and open top 24 of bin 20 (within cabinet 10) are easily accessible to an operator through at least side 12 and optionally through an optionally open side 14.

Popped corn from kettle 22 is dumped into bin 20 for continued warming and ultimate service therefrom by an operator through at least open side 12.

It will be appreciated that while only one kettle 22 is shown, in an alternate embodiment, another popping kettle can be oriented near end 16 of cabinet 10 to provide higher capacity production, and in which case the effluent containment construction to be described nearer cabinet end 18 would preferably be duplicated near end 16. Such a second popping kettle and effluent containment construction is not shown herein for purposes of clarity.

For further definition, the reference to the upper position of the cabinet 10 refers to that portion of the cabinet above the top 24 of bin 20, while the reference to the lower portion of cabinet 10 refers to that portion of the cabinet 10 below the top 24 of bin 20.

Figure 4:
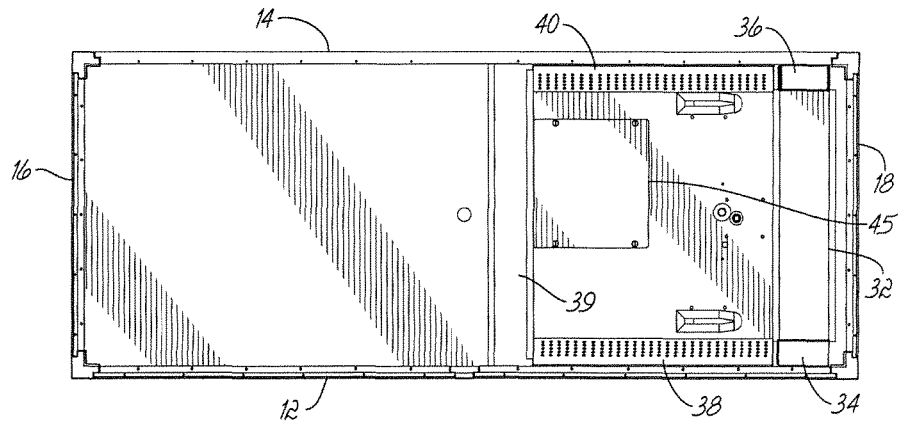
FIG. 4 is a cross-sectional view taken along lines 4-4 of FIG. 1.
Figure 5:
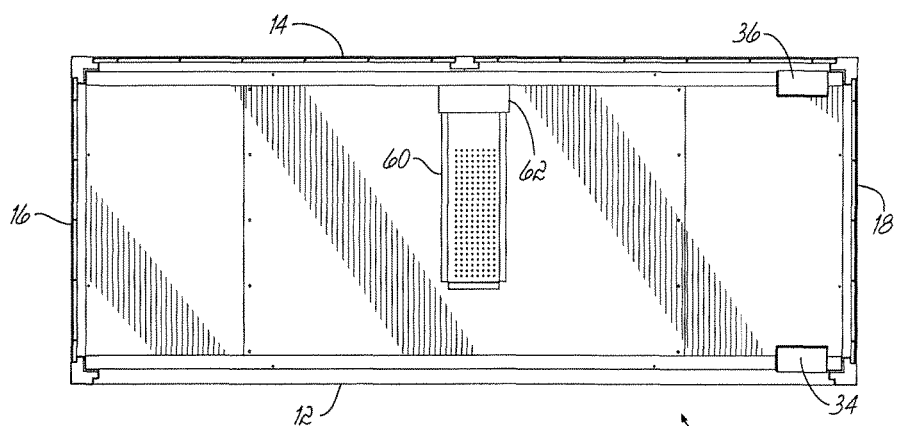
FIG. 5 is a cross-sectional view taken along lines 5-5 of FIG. 1.

Turning now to the effluent containment apparatus and function of the invention, there is shown in respective FIGS. a blower 30, a primary distribution duct 32, vertical curtain projectors 34, 36, intake vents 38-40 (FIG. 4) an filter enclosure 42 housing any suitable air and particular filters 44 and any suitable baffle filters 46.

Figure 6:
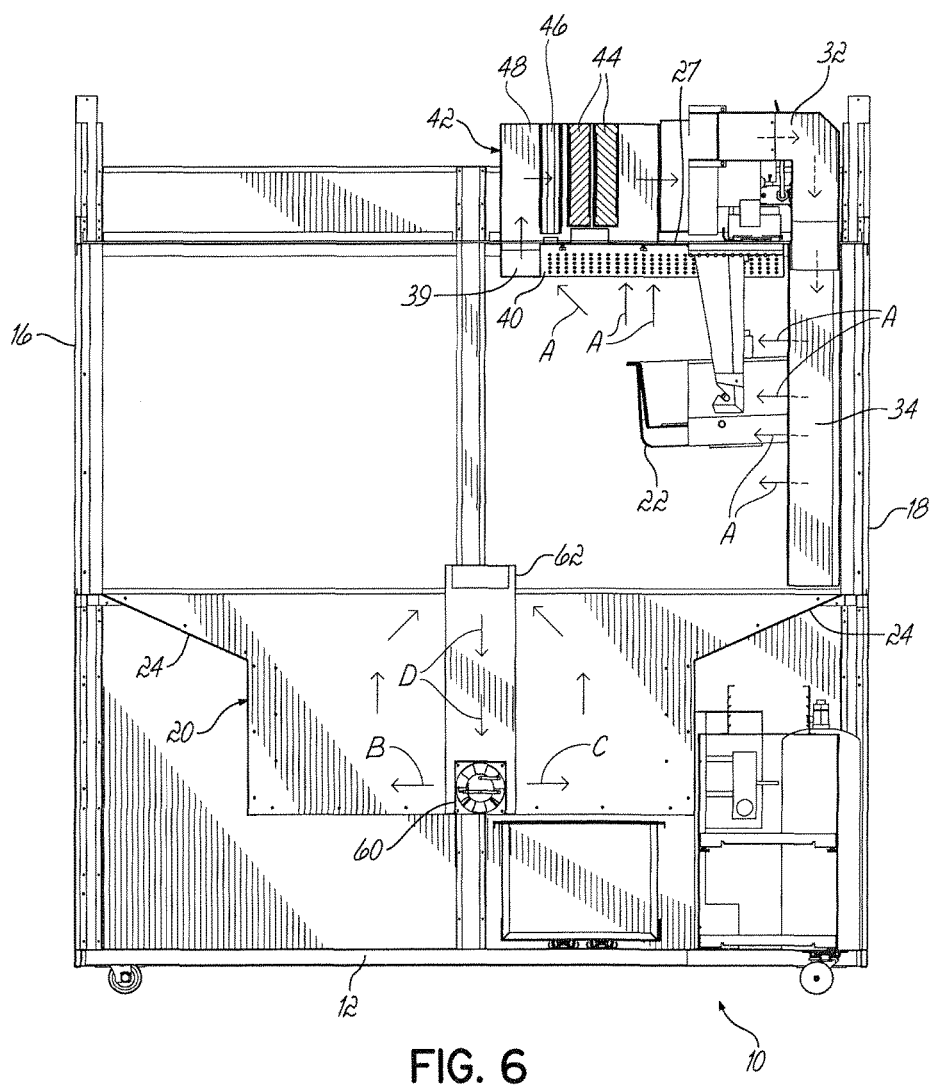
FIG. 6 is a cross-sectional view taken along lines 6-6 of FIG. 2, illustrating further detail of the invention of the Figures.

Intake vents 38-40 are formed generally in a "U"-shaped configuration about an upper portion of cabinet 10 and at a level preferably above the level of kettle 22 and proximate a top wall 27. These vents operably communicate through a plenum 48 (FIG. 6) with filter housing 42, such that air and effluent from the popping operation flows into vents 38-40, through plenum 48, filters 46, 44, blower 30 and distribution duct 32 to vertical air curtain projectors 34, 36. One or more filters can be used as needed or desired, several being shown in FIG. 6 for exemplary illustrating. Projectors 34, 36 are preferably perforated or are fitted with nozzles, in combination producing an air or effluent curtain across the open side 12 (and side 14) of cabinet 10. Preferably the respective air curtains so produced are angled from the respective projectors 34, 36 slightly inward toward the inside of cabinet 10, thus are preferably not parallel but respectively inclined inwardly toward each other. Arrows A in FIG. 6 illustrate the flow of one curtain from vertical projector 34. It will be appreciated that effluent from kettle 22 naturally rises toward the top of cabinet 10, but is further pulled into intakes 38-40.

Filter access cover 45 (FIG. 4) provides access to filters 44, 46 for cleaning or replacement.

Air flow from projectors 34, 36 travels first across, then upwardly into vents 38-40 to complete the flow circuit.

Effluent from the popping of popcorn in kettle 22 tends also to rise for capture within vents 38-40.

A flower divider in plenum 32 separates the flow of now filtered air into two streams, respectively, toward projectors 34, 36.

As previously stated, the velocity of the air flow projected from projectors 34, 36 is effectively produced in cabinet 10 from any further suitable blower 30 having an output capacity as required to draw in effluent from kettle 22 and blow it eventually through projectors 34, 36 to create the desired air curtains. A blower of any suitable capacity is used to provide this air flow. This has at least two beneficial effects; it allows the use of small filters (relative to those used in prior poppers where flows are higher) and it maintains the air curtain velocities at relatively low speeds which do not produce unnecessary turbulence leading to escape of particulate containing effluent. The overall effect is to provide a high percent of particulate capture and to retain air flow within the cabinet 10 so no measurable effluent particulates are projected into the environment around the cabinet 10.

Thus there is no need for hoods or venting ductwork outside or above cabinet 10, even in a large capacity commercial popping operation.

It will be appreciated that it is not believed necessary to define the popping chamber about kettle 22 with wholly confining air curtains, it only being desirable to create air curtains across the open sides 12, 14 of the upper portion of cabinet 10, and to capture effluent flow within the "U"-shaped vents 38-40. This construction and flow efficiently captures particulate-bearing effluent from the popping operation and filters it with a recirculating flow, without escape outside cabinet 10.

If desired, an additional curtain projector could be placed across the center of the cabinet between sides 12 and 14 and directed upwardly toward parallel vent 39, but such additional air curtain is not believed necessary to the objective of efficiently containing and recirculating particulate-bearing effluent.

In another aspect of the invention, warm, heated air is circulated through popped popcorn in bin 20 and recirculated therethrough without escape of such air to the outside of cabinet 10. Bin 20 is an enclosed bin having an open top 24 within cabinet 10. A warmer plenum or housing 60 houses a suitable heating element, such as a 750 watt tubular heater, and a blower, such as a 107 CFM blower, neither being shown. Warm air is projected from plenum 60 into bin 20 and popped corn therein in the direction of arrows B and C. Such warm air flows upwardly then back toward intake duct 62 and downwardly toward the blower and heater operably connected to distribution duct 60 (arrows D).

Such heated air is recirculated through bin 20 and popcorn therein and does not escape from cabinet 10.

It will be appreciated that even though the entire side 12 of the upper portion cabinet 10 is open, and even though side 14 may be likewise open, the invention captures and recirculates effluent from a popcorn popping process, and filters it so few effluent-bearing process-generating particulates escape from the cabinet. Thus, the poppers according to this invention can be installed and retrofitted into theaters and other concerns without the need for additional hoods, venting ductwork or associated costs; no measurable particulate-bearing effluent being released from the cabinet.

The invention thus includes a popcorn popper including a cabinet with at least one open side, an air curtain extending across at least a portion of said open side, air intake vents disposed at a level above a level of a popping kettle within the cabinet and an effluent recirculating flow path from said air curtain, to the air intake vents, filter, blower and back to the air curtain. Warm air is recirculated through a warmer bin in a lower portion of the cabinet.

Vent hoods and ductwork are thus eliminated along with measurable particulate-bearing effluent from a popper cabinet.

As used herein, the term kettle includes a heatable popcorn popping kettle as in U.S. Pat. No. 7,874,244, or any device for popping popcorn and however constructed for applying heat to unpopped popcorn, including by convection, conduction or otherwise.

As used herein, the phrase "air curtain projector" includes any device or structure for establishing a curtain or a flow of air across an open portion or side of a cabinet containing a popcorn popping kettle. Such a projector includes, but is not limited to, a perforated duct, a plurality of nozzles operably extending from or mounted on an air plenum in combination producing an air curtain, a slotted plenum, an air knife or any other suitable structure for establishing a flow of air across an open cabinet side. The projector is a component of an air recirculation system including an intake vent, filters and distribution duct for directing filtered effluent to said projector.

As used herein, the term "effluent" includes steam, vapor, oil vapor and particulates emitted from a popcorn popping operation and including air. As described herein, particulates in the effluent from a popcorn popping operation are progressively filtered from the effluent and any air constituent thereof as the effluent is passed through filters in a recirculation loop.

It will be appreciated that operation of the popper herein without actually popping popcorn results in a recirculating air flow from the blower into and through a distribution ductwork, through an air curtain projector and into intake vents and through a filter system back to the blower substantially without emission of the air from the cabinet defining the popper. When popcorn is popped in the kettle, effluent from the popping operation is entrained in such air flow and is recirculated therewith.

It will further be appreciated that alternatively to the above description, the invention contemplates a popcorn popper wherein the air curtain flow is produced by a blower and an air flow of fresh, non-effluent air.

In such a system, an air intake would be ducted to the air curtain projectors to create the curtains, preventing escape of popping effluent, while popping effluent would be sucked into intake vents such as at 38, 39 and 40, recirculated through filters such as shown in these drawings and directed back into the cabinet at any suitable location for recirculation but captured within the cabinet without discharge therefrom. Other intake vents could be located to receive and recirculate, or to discharge, the fresh air from the air curtain flow, again without significant effluent escape.

Thus, the air curtain would comprise unfiltered, but fresh air, while effluent containing air would be recirculated within the cabinet.

In a slight variation, air within the cabinet, and containing effluent, could be introduced into the air curtain without prior filtration with splitting of air flow to a filtration path for recirculation and to an unfiltered path for air curtain production, all while capturing the benefits of the preferred embodiment described above.

It will also be appreciated that any air or mixed effluent which might be incidentally emitted or separated from the cabinet or the recirculating flow contains less than the regulatory permitted content of particulates now defined as less than 5 milligrams or particulate per cubic meter of air; while preferably no effluent escapes from the cabinet. Thus, as used herein, terms like substantial and significant are used to descriptively to refer relatively to ranges of effluent or particulates discharge according to the invention below such amounts as would be regulatorily prohibited.

What is claimed is:

1. A popcorn popper including a cabinet;
   a popcorn popping kettle in said cabinet;
   said cabinet having an open side proximate said kettle; and
   an elongated air curtain projector located proximate said open side and being configured to establish an air curtain across a portion of said open side,
   wherein said air curtain projector has a vertically oriented longitudinal axis.

2. A popper as in claim 1 further including an intake vent in said cabinet configured to receive effluent from said kettle when popcorn is popped therein.

3. A popper as in claim 2 wherein said kettle is oriented at one level in said cabinet and said intake vent is disposed at a higher second level.

4. A popper as in claim 3 wherein said intake vent is in a "U"-shape.

5. A popper as in claim 4 wherein said cabinet has a closed end and wherein an open portion of said "U"-shape intake vent is oriented toward said closed end.

6. A popper as in claim 1 including an effluent recirculating passage having an intake vent open to said cabinet, a filter, a blower and a distribution duct for passing air to said air curtain projector.

7. A popper as in claim 6 wherein said intake vent is disposed above a level of said kettle and passes effluent therefrom into said recirculating passage.

8. A popper as in claim 1 further including a popcorn warmer bin in said cabinet at a position beneath said kettle;
   a blower having an outlet in said bin and being configured to blow heated air through popped popcorn in said bin,
   a return duct to said blower disposed in said bin and being configured to recirculate air from said popped popcorn back to said blower.

9. A popper as in claim 1 wherein said projector is oriented to direct an air curtain in an inward direction with respect to said cabinet.

10. A popcorn popper including:
    a cabinet;
    a popcorn popping kettle within said cabinet;
    said cabinet having at least one open side proximate said kettle;
    at least one air curtain projector located proximate said open side and being configured to establish an air curtain across at least a portion of said open side;
    at least one intake vent in said cabinet and being configured to receive effluent from said kettle when popping popcorn;
    an air recirculation passage configured to receive effluent from said intake vent;
    a filter in said passage configured to filter particulates out of said effluent in said passage; and
    said passage being operably connected to said air curtain projector and directing effluent with said air curtain.

11. A popper as in claim 10 wherein said air curtain projector is oriented to direct said air curtain in an inward direction with respect to said cabinet open side.

12. A popper as in claim 10 wherein said air curtain is included inwardly with respect to said open side.

13. A popcorn popper including:
    a cabinet having a popcorn popping kettle therein;
    said cabinet having an open side;
    means for establishing an air curtain across a portion of said open side; and
    means for recirculating effluent from popping of popcorn through a filter and into said air curtain to reduce emission from the cabinet of particulate-bearing effluent therefrom.

* * * * *